US009455656B2

(12) United States Patent
Dixon et al.

(10) Patent No.: US 9,455,656 B2
(45) Date of Patent: Sep. 27, 2016

(54) MOTOR CONTROLLERS

(71) Applicant: TRW Limited, Solihull West Midlands (GB)

(72) Inventors: Christopher David Dixon, West Midlands (GB); Robert James Huxford, West Midlands (GB)

(73) Assignee: TRW Limited, Solihull, West Midlands (GB)

( * ) Notice: Subject to any disclaimer, the term of this patent is extended or adjusted under 35 U.S.C. 154(b) by 0 days.

(21) Appl. No.: 14/647,972

(22) PCT Filed: Nov. 27, 2013

(86) PCT No.: PCT/GB2013/053141
§ 371 (c)(1),
(2) Date: May 28, 2015

(87) PCT Pub. No.: WO2014/083338
PCT Pub. Date: Jun. 5, 2014

(65) Prior Publication Data
US 2015/0340979 A1    Nov. 26, 2015

(30) Foreign Application Priority Data

Nov. 30, 2012  (GB) .................................. 1221634.7

(51) Int. Cl.
*H02K 29/10*       (2006.01)
*H02P 6/16*        (2016.01)
*G01D 5/244*       (2006.01)

(52) U.S. Cl.
CPC ................. *H02P 6/16* (2013.01); *G01D 5/244* (2013.01); *G01D 5/24476* (2013.01)

(58) Field of Classification Search
CPC ........... H02K 29/10; H02P 1/46; H02P 1/18; H02P 6/00; H02P 8/00; H02P 25/06; H02P 25/08

USPC ............ 318/400.01, 400.02, 400.14, 400.15, 318/400.4, 700, 701, 721, 779, 685, 696, 318/727, 799, 800, 430, 432, 437, 400.37, 318/400.38, 400.39, 400.32; 340/11.1; 345/165

See application file for complete search history.

(56) References Cited

U.S. PATENT DOCUMENTS 5,065,263 A  *  11/1991  Yoshida ............... G11B 21/106
                                               360/77.03
5,602,544 A  *   2/1997  Takahashi ............ G01D 5/2457
                                               250/231.1

(Continued)

FOREIGN PATENT DOCUMENTS

JP      2001033471 A     2/2001
WO      2011125360 A1   10/2011

OTHER PUBLICATIONS

Intellectual Property Office Patent Act 1977: Search Report under Section 17, Application No. GB1221634.7 dated Mar. 22, 2013.

(Continued)

*Primary Examiner* — Antony M Paul
(74) *Attorney, Agent, or Firm* — MacMillan, Sobanski & Todd, LLC (57) ABSTRACT

A method of estimating the position of a rotor of an electric motor comprises producing an output signal indicative of motor position using a position sensor which comprises a detector and at least one encoder which rotates along with the rotor of the motor and includes a plurality of encoding regions, the output signal of the sensor varying in a stepwise fashion as the encoding regions move past the detector, and passing the output of the sensor through a smoothing algorithm to produce an estimated position signal, the algorithm being arranged to smooth the transition between the steps in the output of the sensor by causing the estimated position signal to lag behind the output of the sensor following a step change in the output of the sensor.

11 Claims, 5 Drawing Sheets

(56) References Cited

U.S. PATENT DOCUMENTS

| | | | |
|---|---|---|---|
| 6,081,087 A | 6/2000 | Iijima et al. | |
| 7,294,988 B2 * | 11/2007 | Ajima | B60K 6/26 318/430 |
| 8,723,462 B2 * | 5/2014 | Jang | G01P 3/481 318/280 |
| 8,810,188 B2 * | 8/2014 | Husain | H02P 25/0925 318/434 |
| 8,884,572 B2 | 11/2014 | Yoshitake et al. | |
| 2008/0120055 A1 | 5/2008 | Cheng | |
| 2010/0156336 A1 | 6/2010 | Ting et al. | |
| 2011/0202308 A1 * | 8/2011 | Kishida | G01B 7/30 702/151 |
| 2011/0298411 A1 * | 12/2011 | Yoshida | G01D 5/3473 318/640 |

OTHER PUBLICATIONS

PCT International Search Report and the Written Opinion, Application No. PCT/GB2013/053141 filed Nov. 27, 2013, dated Apr. 9, 2015.

* cited by examiner

MOTOR CONTROLLERS

CROSS-REFERENCE TO RELATED APPLICATIONS

This application is a national stage of International Application No. PCT/GB2013/053141 filed Nov. 27, 2013, the disclosures of which are incorporated herein by reference in entirety, and which claimed priority to Great Britain Patent Application No. 1221634.7 filed Nov. 30, 2012, the disclosures of which are incorporated herein by reference in entirety.

BACKGROUND OF THE INVENTION

This invention relates to method of estimating the position of a rotor in a motor, and to motor control apparatus.

Figure 2:
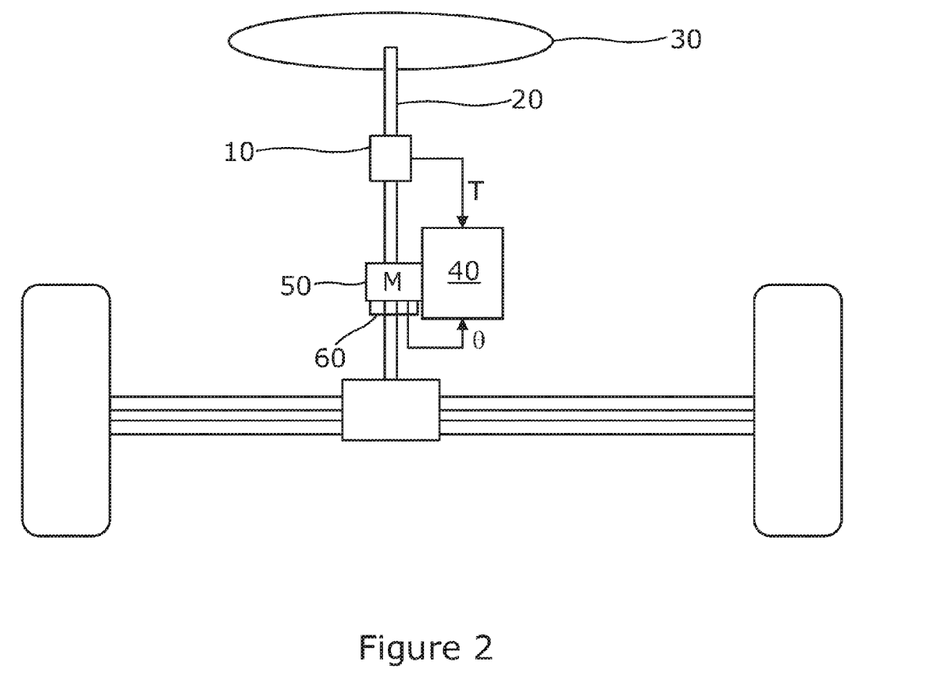
FIG. 2 is an overview of an electric power assisted steering system which includes an electric motor that can be controlled by the strategy of FIG. 1.

It is known to use electric motors in a wide variety of applications, one application with unique challenges being electric power assisted steering systems. This is shown in FIG. 2 of the drawings. In a typical system, a torque sensor 10 measures the torque applied to a steering shaft 20 by a driver turning the steering wheel 30. This torque measurement is passed to a motor control and drive circuit 40 which produces an assistance demand signal equal to the amount of assistance torque to be applied to the steering system. The demand signal is used to generate currents that are applied to the phases of an electric motor 50 attached to the steering shaft 20, or some other part of the steering system, through a gearbox (not shown). The motor applies the demanded torque to the steering system, making it easier for the driver to turn the wheel.

The driver is in physical contact with the steering wheel 30 and so feels the effect of the torque applied to the steering shaft by the motor. The driver will be able to feel any unexpected changes in torque output from the motor as the wheel is turned. This is especially the case at low speeds of rotation of the steering wheel. If the torque output from the motor varies suddenly with the angular position of the motor rotor this might be felt by the driver.

To ensure accurate operation of the motor 50 it is common to use closed loop control, in which the motor torque demand is compared with an actual measurement of the current applied to the motor 50. The torque applied by the motor depends on the current flowing in each phase. For many motor control strategies which employ PWM to modulate the torque, accurate control of the current for each phases requires knowledge of the motor angular position, especially important where a pulse width modulation scheme is used to set the torque. The position can be measured directly using a sensor 60 attached to the motor rotor or to a part of the system that rotates as the motor rotates, such as the gearbox.

Most, if not all, position sensors, produce an output that has a number of discrete states, the signal changing abruptly at a "step" between each stage. Each of the steps will occur at a different angular position of the motor determined by the layout of the position sensor encoder and the arrangement of the position sensor detector. At high velocities interpolation may be used between the states to improve the resolution of the sensor, but the applicant has appreciated that interpolation cannot be used at low speeds where inaccurate motor rotor velocity information is available. Sudden jumps between position states then occur, which lead to corresponding step changes in the torque output from the motor.

Figure 3:
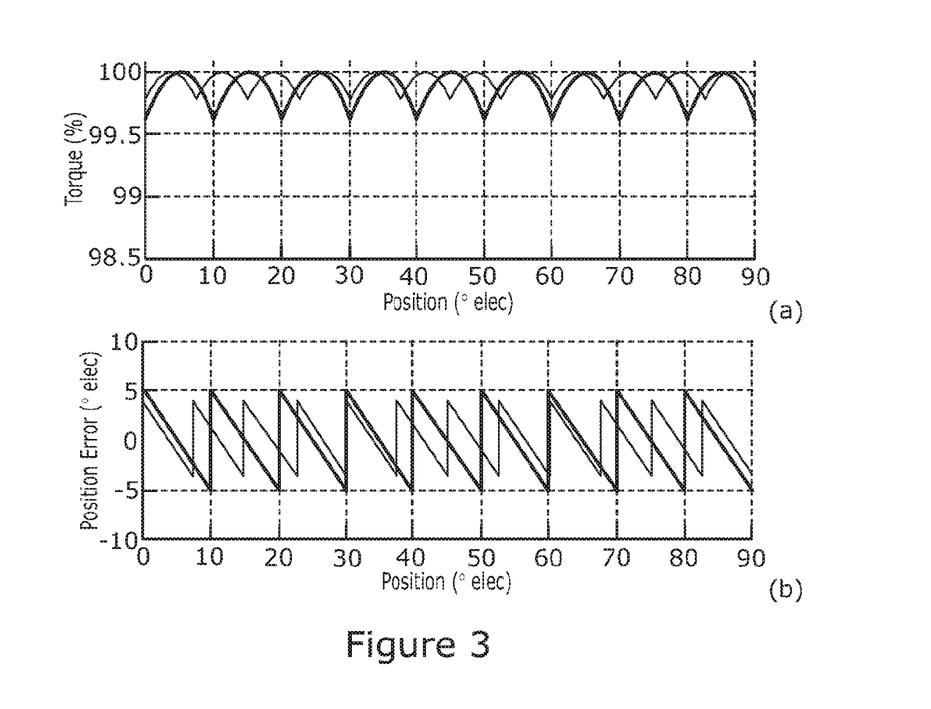
Figure 4:
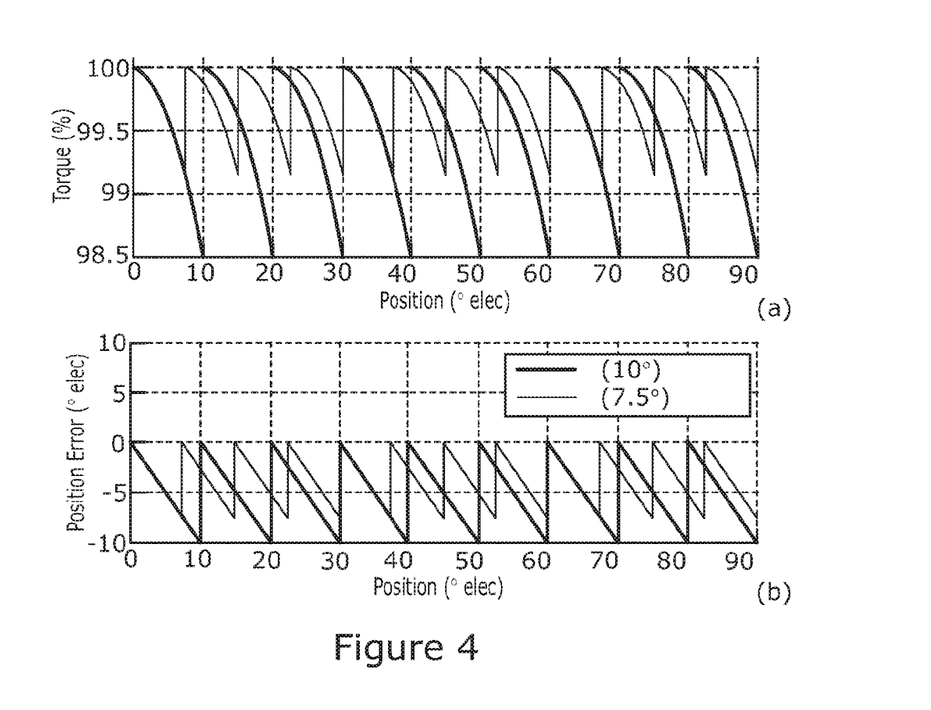

FIGS. 3a and 4a show the variation in torque with motor position that arise when a constant torque is demanded but an error in the position measurement is used in the motor control. The dark lines correspond to a resolution between steps of 10 degrees and the lighter lines correspond to a resolution between steps of 7.5 degrees. FIGS. 3b and 4b showing the actual variation in underlying errors in position against actual position that arise when the position signal is accurate only at the midpoint between steps or accurate only alongside a step respectively.

BRIEF SUMMARY OF THE INVENTION

A feature of the present invention is to ameliorate some of the problems that arise due to inaccurate position signals that contain sudden stepped changes in value.

According to a first aspect the invention provides a method of estimating the position of a rotor of an electric motor comprising: Producing an output signal indicative of motor position using a position sensor which comprises a detector and at least one encoder which rotates along with the rotor of the motor and includes a plurality of encoding regions, the output signal of the sensor varying in a stepwise fashion as the encoding regions move past the detector; and Passing the output of the sensor through a smoothing algorithm to produce an estimated position signal, the algorithm being arranged to smooth the transition between the steps in the output of the sensor by causing the estimated position signal to lag behind the output of the sensor following a step change in the output of the sensor.

By allowing the output to lag behind the actual output of the sensor rather then abruptly changing with a step change in the output signal, the rapid changes in the signal will be smoothed out. This removes the step changes which is especially advantageous if the position signal is used as part of a motor control strategy. The estimated signal will lag behind until it is has been able to ramp up to the level of the top of the step change.

The method may comprise the step of smoothing the output signal from the sensor by passing the output signal through a low pass filter.

Alternatively, the method may comprise smoothing the output signal by applying a fixed slew rate to the output signal following a change in the output of the detector. In effect the fixed slew rate limits the rate at which the output can catch up to the actual position signal to a fixed (perhaps linear) rate of change.

The slew rate may be fixed, by which we mean a fixed rate of change is allowed, or may be varied, by which we mean the rate of change that is allowed may vary. It may be varied as a function of the elapsed time between step changes in the output signal.

The method may therefore comprise measuring the elapsed time between step changes, and setting the slew rate as a function of the elapsed time. The elapsed time may comprise the time between the most recent step change and the preceding step change.

The method preferably comprises optimising the filter constant or the slew rate to ensure that, during constant speed of the motor, the estimated position signal has caught up with the actual position signal at the instant that the next step change in position signal occurs.

The method may further comprises, when an estimate of the velocity is available as the rotor velocity is above a predetermined threshold, generating an alternative estimate of position based upon interpolation of the output signal from the position sensor. Thus the method may comprise switching between one strategy which uses filtering/slew rate at low speeds and another based on extrapolation at higher speeds.

According to a second aspect the invention provides a motor control apparatus comprising a signal processing means arranged to receive an output signal from a motor position sensor, a current control circuit which receives as an input a motor torque demand signal and produces as an output d-q axis motor current demand signals and converts the d-q-axis demand currents into individual motor phase currents by combining the d-q-axis demand currents with an estimate of motor position.

Characterised in that the signal processing means includes a smoothing algorithm, and processes the output signal from the motor position sensor by passing it through the smoothing algorithm to produce the estimate of motor position.

The smoothing algorithm of the signal processing means may include a comprising a low pass filter. This may be a first order filter. Alternatively, the algorithm may comprise a slew rate function that applies a fixed slew rate to the signal whenever the actual rate of change of the signal has exceeded a threshold.

The position sensor may produce an output signal that varies stepwise with angular position, the filter or slew rate filter causing the estimate of position to lag behind the output signal following a step change.

The encoder of the position sensor may be fixed relative to the rotor of the motor. It may be fixed to a component that is connected to the motor rotor through a gearbox. In either case, as the motor rotor turns the encoder will turn. It may comprise a rotary encoder. It may produce stepped values as an output signal which do not repeat within an electrical rotation of the motor. The stepped changes may occur at equal intervals across a full 360 degree electrical rotation of the motor. Where it is connected through a gearbox, the output signal may repeat after more than one electrical rotation of the motor, or may repeat several times within one electrical rotation.

In accordance with a further aspect the invention provides in combination a motor, a position sensor and a motor control apparatus of the preceding aspect.

The motor may comprise a part of an electric power assisted steering system.

Other advantages of this invention will become apparent to those skilled in the art from the following detailed description of the preferred embodiments, when read in light of the accompanying drawings.

BRIEF DESCRIPTION OF THE DRAWINGS

FIG. 3 (a) is a plot of motor torque against motor position, and (b) position error against motor position, for two different motors, in which the actual position is aligned with the centre of an encoder element;

FIG. 4 is (a) is a plot of motor torque against motor position, and (b) position error against motor position, for two different motors in which the actual position is aligned with one edge of an encoder element;

DETAILED DESCRIPTION OF THE INVENTION

Figure 1:
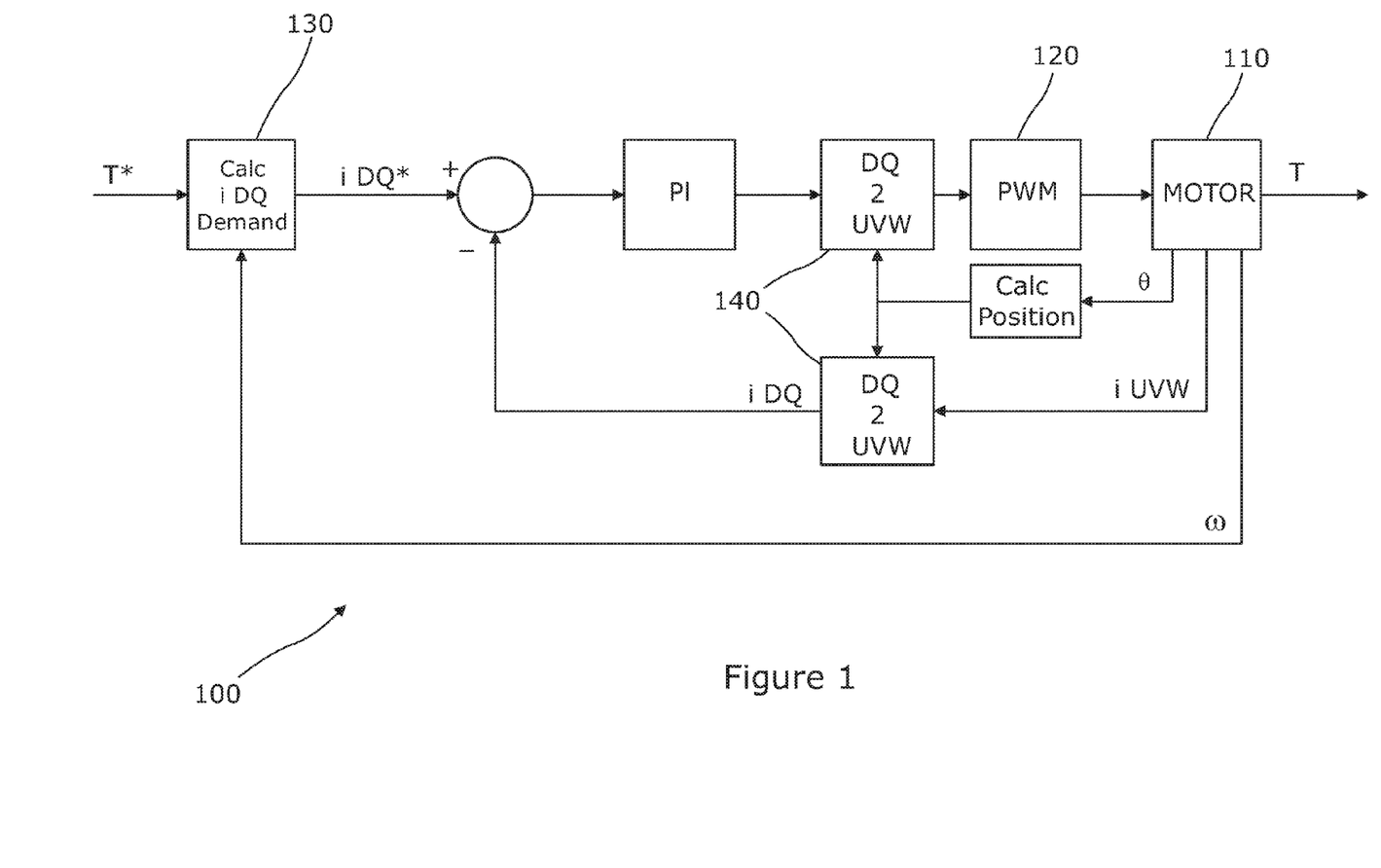
FIG. 1 is a block diagram showing a typical motor control strategy which incorporates an estimate of motor position.

A typical closed loop motor control system 100 for a three phase motor typically has a structure as shown in FIG. 1. The motor 110 may be considered to have three phases, U, V and W, and may be connected in a star or delta configuration. Each phase is connected to an arm of a bridge drive circuit represented in FIG. 1 by the block labelled "PWM". Each arm comprises a top switch connecting the phase to a positive supply voltage and a bottom switch connecting the phase to a negative supply voltage or ground. The six switches are turned on and off apply pulse width modulated voltages to each phase in a known manner. Several PWM strategies can be used, and for the purposes of this invention the choice of strategy is not in any way limiting.

The PWM signals for the motor phases are derived using a closed loop control, with the inputs to the control being the demanded torque T* from the motor, the measured angular velocity w of the motor rotor, the rotor position θ and the current in each phase measured by a current sensor or otherwise estimated. The demanded torque is used to determine d axis and q axis motor currents Id and Iq in block 130 and from these the individual phase currents are calculated in block 140.

The position sensor (not shown) for the purpose of the following examples comprises an encoder disk secured to the motor rotor and a set of detectors. The encoder disk carries a set of encoder regions that are arranged as a circumferential track comprising a predetermined pattern of encoding regions. The encoding regions may comprise magnets and spaces between magnets, or a sequence of reflective and non-reflective portions. Instead of an encoding disk the encoder may be formed by the rotor magnets where a motor of that kind is provided. As the disk rotates the track moves relative to the detectors, which each "see" the variation in the track from different points along the track. The variation in the output of the detectors as edges of the encoding regions pass the detectors provides the sensor resolution.

The resolution is therefore a function of the spacing between encoding regions and the relative positions of the detectors. To obtain a higher resolution position signal than the resolution provided by the encoder regions themselves, the measurement of the velocity of the rotor in each embodiment is used to extrapolate between the edges in the output signal from the position sensor. However, at very low speeds it is not possible to accurately measure the velocity and the extrapolation is disabled, reducing the resolution of the position signal to that of the raw stepped output signal resolution, θenc. In the following embodiments an alternative, novel, method of estimating position at low speeds that does not rely on interpolation is suggested.

In each proposed method, it is proposed to implement an algorithm that, when a new edge occurs, change position gradually rather than presenting the step change that occurs as the edge of an encoder region passes the detector. Three solutions are proposed:

1. Filter
2. Fixed slew rate limit
3. Variable slew rate limit

In all cases a change in relative encoder position drives the algorithm.

First Order Filter

Figure 5:
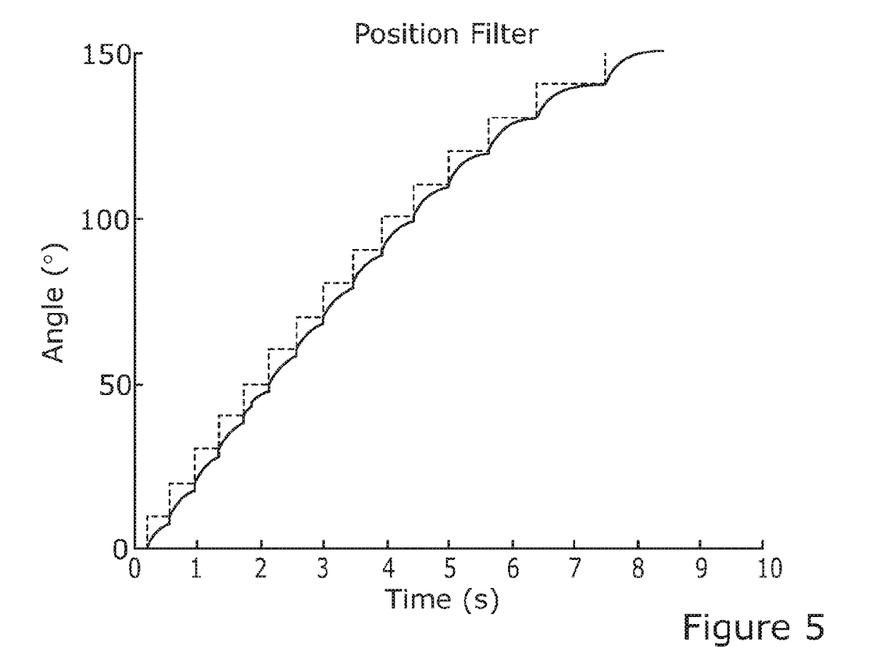
FIG. 5 is a plot of output signal from a position sensor against time overlaid with a plot of smoothed estimated rotor position against time for a method employing a smoothing algorithm including a fixed corner frequency first order filter.
Figure 6:
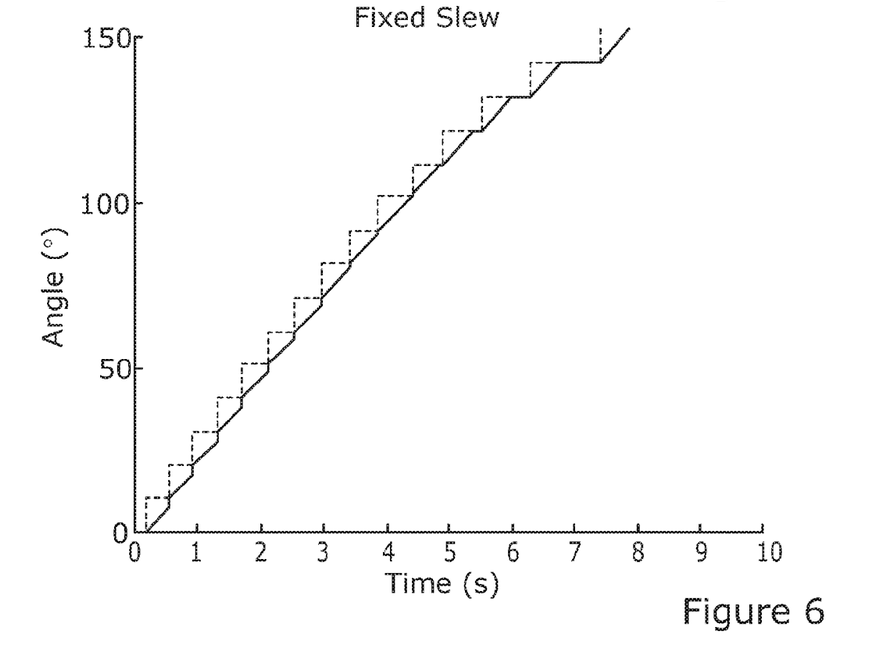
FIG. 6 is a plot of output signal from a position sensor against time overlaid with a plot of smoothed estimated rotor position against time for a method employing a smoothing algorithm including a fixed slew rate.
Figure 7:
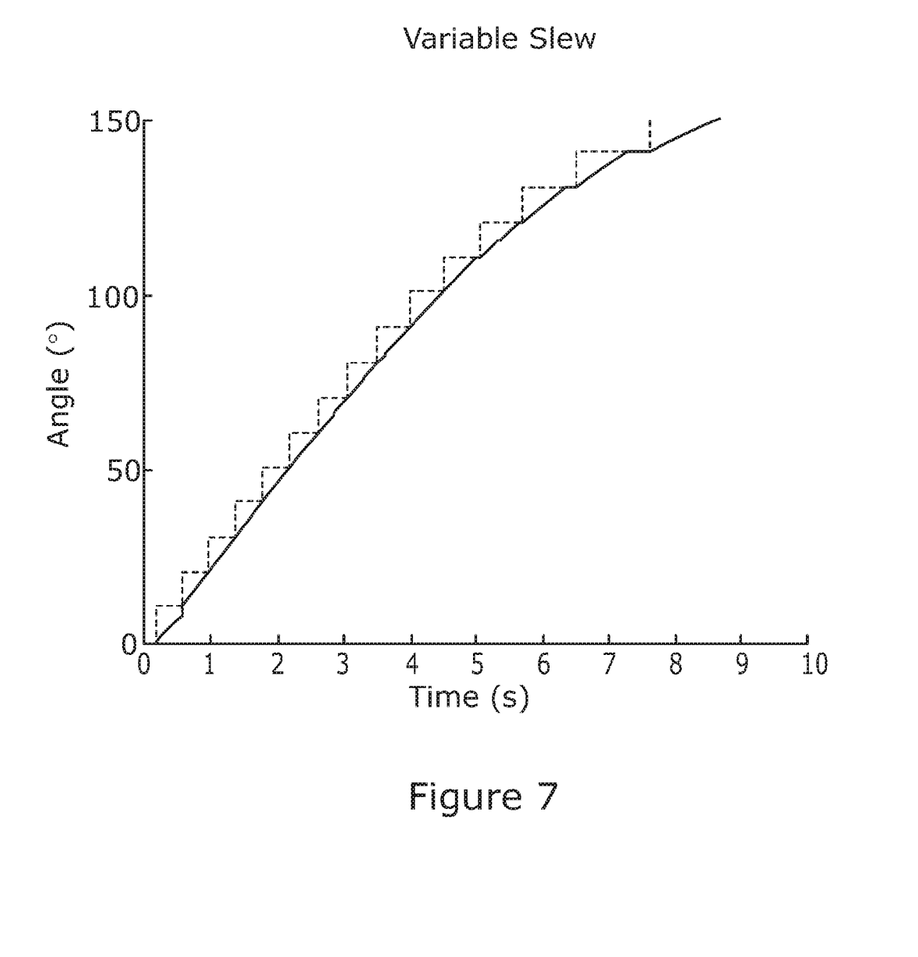
FIG. 7 is a plot of output signal from a position sensor against time overlaid with a plot of smoothed estimated rotor position against time for a method employing a smoothing algorithm including a variable slew rate.

In a first embodiment, a first order filter is used to smooth out the step changes in the output signal from the position sensor. The raw "stepped" output signal of the position sensor is fed into the filter, the output of which produces a response as shown in FIG. 5. For clarity the filtered signal is overlaid on the raw output signal. This filtered position signal is then used as the estimate of position by the control loop for the motor. Because the signal is smoothed, the sudden changes in error value between the estimated and actual positions are smoothed, which in turn smoothes out the step changes in torque that would be produced without any smoothing.

It can be seen that for all speeds the filtering will remove the sharp step change in position, in turn removing the corresponding sharp step change in torque applied by the motor. However, the algorithm works best at a particular speed which is matched to the filter frequency. Too slow in speed and the filter produces rounded steps as shown in the right hand side of Figure; too fast and the filter does not get chance to act.

In a refinement, the time constant may be varied as a function of the time elapsed between the detection of two encoder edges (effectively motor speed but too slow to produce reliable velocity signal) so that the filtering adapts as the motor changes speed.

Fixed Slew Rate

In an alternative embodiment, a fixed slew rate is used instead of a filter. The raw "stepped" position signal is fed to an input of a function that causes the signal value to change (increase or decrease) in a linear fashion at a fixed rate of change until the slewed value catches up with the raw input value. This produces the results shown in FIG. 3-5.

Unlike the first order filter, the output in this embodiment may be produced by taking the encoder position value before a step change occurred and adding to this an incremental value which represents the slew part, the increment value increasing linearly over time until the increment has reached the magnitude of the step change. At this point, the output may be set to equal the value of the "raw" stepped signal after the step change.

As with the first order filter the slew rate must be carefully chosen to act at the correct speed. Again the slew rate could be scheduled with time between encoder edges.

Variable Slew Rate

In a further alternative embodiment, a variable slew rate is used instead of a filter or fixed slew rate. This can be seen in FIG. 3-6. The slew rate is set using timing information from the last two encoder edges so that the output will complete the step change over this period. The timing information is used by the algorithm to increase the slew rate when the time elapsed is short (high motor speed) and increase the rate when it is long (low motor speed).

Ideally, when running at a constant speed, the slew rate should complete at the point where the next edge is received. In some cases it may be desirable to speed up the slew rate to reach the final value faster. To allow this encoder slew rate gain may be adapted to adjust the slew rate increment by a scaling factor, (encoder slew rate gain >1 speed up slew, encoder slew rate gain <1=slow down slew).

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method of estimating the position of a rotor of an electric motor comprising:
   producing an output signal indicative of motor position using a position sensor which comprises a detector and at least one encoder which rotates along with the rotor of the motor and includes a plurality of encoding regions, the output signal of the sensor varying in a stepwise fashion as the encoding regions move past the detector; and
   passing the output signal of the position sensor through a smoothing algorithm to produce an estimated position signal, the algorithm being arranged to smooth the transition between the steps in the output signal of the position sensor by causing the estimated position signal to lag behind the output signal of the position sensor following a step change in the output signal of the position sensor.

2. The method according to claim 1 comprising the step of smoothing the output signal from the position sensor by passing the output signal through a low pass filter.

3. The method according to claim 1 comprising smoothing the output signal by applying a fixed slew rate to the output signal following a change in the output of the position sensor.

4. The method according to claim 3 in which the slew rate is varied as a function of elapsed time between step changes in the output signal.

5. The method according to claim 4 comprising measuring the elapsed time between step changes, and setting the slew rate as a function of the elapsed time.

6. The method according to claim 3 comprising optimising the filter constant or the slew rate to ensure that, during constant speed of the motor, the estimated position signal has caught up with the actual position signal at the instant that the next step change in position signal occurs.

7. The method according to claim 1 which further comprises, the step of obtaining an estimate of a velocity of the rotor and in the event that the estimate of the velocity is available as the rotor velocity is above a predetermined threshold, generating an alternative estimate of position based upon interpolation of the output signal from the position sensor.

8. A motor control apparatus comprising a signal processing means arranged to receive an output signal from a motor position sensor, a current control circuit which receives as an input a motor torque demand signal and produces as an output d-q axis motor current demand signals and converts the d-q-axis motor current demand signals into individual motor phase currents by combining the d-q-axis motor current demand signals with an estimate of motor position, wherein the signal processing means includes a smoothing algorithm, and processes the output signal from the motor position sensor by passing it through the smoothing algorithm to produce the estimate of motor position.

9. The motor control apparatus according to claim 8 in which the smoothing algorithm of the signal processing means comprises a low pass filter.

10. The motor control apparatus according to claim 9 in which the position sensor in use produces an output signal that varies stepwise with angular position, the filter causing the estimate of the motor position to lag behind the output signal following a step change.

11. The motor control apparatus according to claim 8 in which the smoothing algorithm of the signal processing means comprises a slew rate function that applies a fixed or variable slew rate to the output signal whenever an actual rate of change of the output signal has exceeded a threshold.

* * * * *